| (12) | United States Patent | (10) Patent No.: US 12,337,423 B2 |
|---|---|---|
| | Wozel et al. | (45) Date of Patent: Jun. 24, 2025 |

(54) CLAMPING DEVICE FOR LONGITUDINAL-SEAM-WELDED PIPE ELEMENTS

(71) Applicant: EEW SPECIAL PIPE CONSTRUCTIONS GMBH, Rostock (DE)

(72) Inventors: Martin Wozel, Pastow (DE); Ulrich Sitz, Rostock, DE (US)

(73) Assignee: EEW SPECIAL PIPE CONSTRUCTIONS GMBH, Rostock (DE)

( * ) Notice: Subject to any disclaimer, the term of this patent is extended or adjusted under 35 U.S.C. 154(b) by 273 days.

(21) Appl. No.: 18/012,151

(22) PCT Filed: Jun. 16, 2021

(86) PCT No.: PCT/EP2021/066297
§ 371 (c)(1),
(2) Date: Feb. 13, 2023

(87) PCT Pub. No.: WO2021/259735
PCT Pub. Date: Dec. 30, 2021

(65) Prior Publication Data

US 2023/0219178 A1     Jul. 13, 2023

(30) Foreign Application Priority Data

Jun. 26, 2020   (EP) .................................. 20 182 571

(51) Int. Cl.
*B23K 37/00* (2025.01)
*B21C 37/08* (2006.01)
(Continued)

(52) U.S. Cl.
CPC .......... *B23K 37/0535* (2013.01); *B21C 37/08* (2013.01); *B23K 2103/04* (2018.08)

(58) Field of Classification Search
CPC . F16L 55/18; B23K 37/0435; B23K 37/0538; B25B 5/04; B25B 5/147; B25B 5/163
See application file for complete search history.

(56) References Cited

U.S. PATENT DOCUMENTS

| 2,557,202 A * | 6/1951 | Raymond ............... B25B 5/147 81/90.4 |
| 4,152,573 A | 5/1979 | Saurin et al. |
| | | (Continued) |

FOREIGN PATENT DOCUMENTS

| CN | 109465594 | 3/2019 |
| CN | 110076516 | 8/2019 |
| | (Continued) | |

OTHER PUBLICATIONS

Official Communication issued in International Patent Application No. PCT/EP2021/066297, dated Sep. 15, 2021, along with English translation.

(Continued)

*Primary Examiner* — Erin B Saad
(74) *Attorney, Agent, or Firm* — GREENBLUM & BERNSTEIN, P.L.C.

(57) ABSTRACT

Provided is a clamping device for temporarily connecting two ends of a large-pipe element with at least two connection devices and a rigid connection rod, with the connection devices being arranged at the ends of the connection rod. The clamping device is used to connect and secure the plate ends of large pipes and large-pipe elements. The clamping device is, unlike the known tack welds or auxiliary connectors (cleats), mobile, reusable, and versatile. It can be mounted quickly and securely on pipe elements of different diameters in order to reduce the load on the tack weld and, in the event of tack weld failure, take the place of it.

15 Claims, 2 Drawing Sheets

Figure 1:
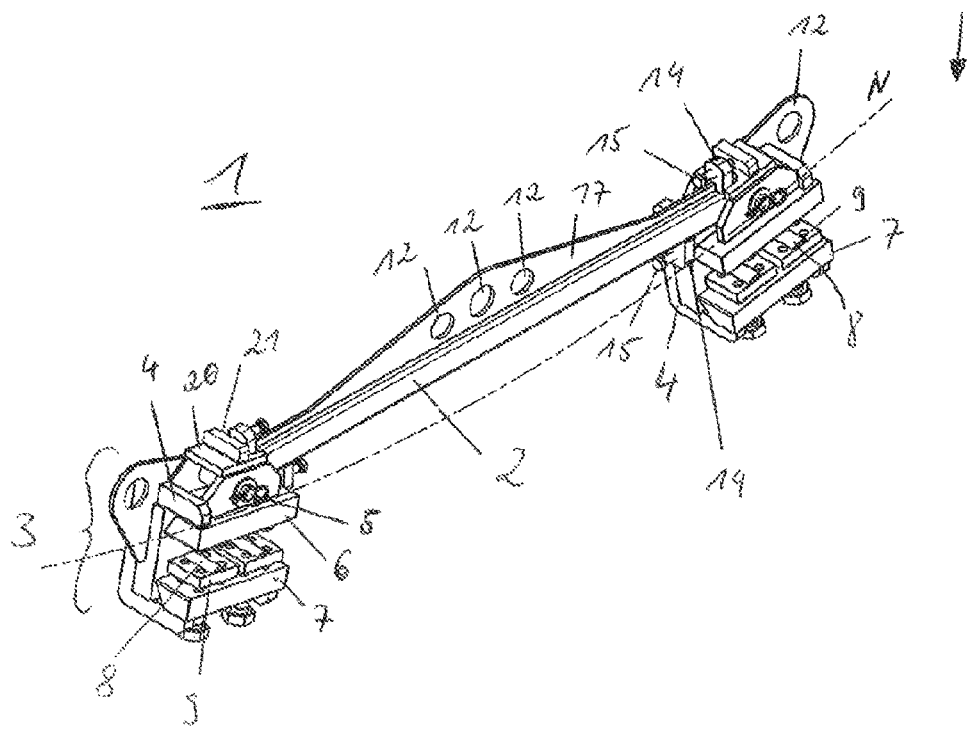

(51) Int. Cl.
B23K 37/0535 (2025.01)
B23K 103/04 (2006.01)

(56) References Cited

U.S. PATENT DOCUMENTS

| | | | | |
|---|---|---|---|---|
| 4,315,132 | A | 2/1982 | Saurin et al. | |
| 6,237,445 | B1* | 5/2001 | Wesch, Jr. | E21B 19/161 81/57.33 |
| 8,011,426 | B1* | 9/2011 | Orgeron | E21B 19/155 166/85.1 |
| 8,496,238 | B1* | 7/2013 | Orgeron | E21B 19/155 29/244 |
| 10,663,103 | B2* | 5/2020 | Strother | F16L 55/1705 |
| 11,460,138 | B1* | 10/2022 | Smyth | F16L 55/18 |
| 2004/0076486 | A1* | 4/2004 | Horisberger | B23K 37/0533 409/225 |
| 2006/0214342 | A1* | 9/2006 | Girard | B23K 37/0435 269/43 |
| 2007/0013117 | A1* | 1/2007 | Bortoli | B25B 5/147 269/268 |
| 2007/0068345 | A1* | 3/2007 | Flud | E21B 19/163 81/57.19 |
| 2008/0230972 | A1* | 9/2008 | Ganley | B25B 5/147 269/287 |
| 2013/0126030 | A1* | 5/2013 | Green | B25B 9/00 138/97 |
| 2015/0102544 | A1* | 4/2015 | Bortoli | B25B 5/147 269/157 |
| 2015/0174706 | A1* | 6/2015 | McClure | B23K 37/0533 269/45 |
| 2017/0232580 | A1* | 8/2017 | Howard | B25B 1/103 269/81 |
| 2018/0104907 | A1* | 4/2018 | Bortoli | B29C 65/20 |
| 2018/0274710 | A1* | 9/2018 | Strother | F16L 55/1683 |
| 2019/0210168 | A1 | 7/2019 | McClure | |
| 2019/0224786 | A1 | 7/2019 | LaValley et al. | |
| 2023/0182238 | A1* | 6/2023 | Bortoli | B25B 5/163 269/152 |
| 2024/0066641 | A1* | 2/2024 | Staschko | B05B 13/0214 |
| 2024/0131612 | A1* | 4/2024 | Ma | B23K 15/002 |

FOREIGN PATENT DOCUMENTS

| | | |
|---|---|---|
| CN | 209190158 | 8/2019 |
| DE | 2806185 | 8/1978 |
| GB | 1568934 | 6/1980 |
| WO | 2014/001408 | 1/2014 |

OTHER PUBLICATIONS

Translation of Official Communication issued Tawainese pat. app. No. 110123317 issued Dec. 4, 2024.

* cited by examiner

CLAMPING DEVICE FOR LONGITUDINAL-SEAM-WELDED PIPE ELEMENTS

The invention relates to a clamping device according to the generic part of claim 1.

Longitudinal-seam-welded large pipes, in particular made of steel sheets, with a considerable diameter are used, for example, in the petroleum industry or in the production of large structures made of metal. An important field of application is also foundation construction for offshore installations, in particular wind turbines. For large pipes that are used in the offshore sector, for example as monopiles or tripods, pipe diameters of greater than 5 m and now greater than 7 m are no longer a rarity.

Longitudinal-seam-welded large-pipe elements are manufactured from steel sheet panels. The sheet panel blank is first bent into a round shape; the open edges of the resulting open-seam pipe element are tacked together using a temporary seam (tack welding) that is removed again later in the production process. The effort for welding and removing the tack weld should be as small as possible in order to ensure a high throughput. The tack weld is intended to prevent the tack-welded pipe element from breaking apart during transport, which poses a risk in particular for a heavy pipe with a large diameter and wall thickness due to the considerable mass that is being moved. The tack-welded pipe element is positioned in the welding bay, and the inner seam is first applied to the pipe element and then the outer seam.

From WO 2014/001408 A1, a system for tack-welding longitudinal-seam-welded pipes made of sheet metal panels is known. For the production of a large pipe, multiple sequential work steps are described. After the weld seam preparation by means of milling, the sheet metal panel is first pre-bent on the longitudinal edges. The pre-bent sheet metal panel is placed in a pipe-forming press, where it is bent into the desired shape until the sheet metal panel has been formed into the open-seam pipe. The longitudinal seam of the open-seam pipe is then tacked by welding and, in a separate work step, welded together to form the finished longitudinal-seam-welded pipe element.

Due to the assessment of load-bearing capacity, it may be necessary to weld auxiliary connectors (cleats) into the pipe elements in addition to the tack weld, for the safe transport of pipe elements with a diameter of 6 m or more. The auxiliary connectors are intended to support the tack weld and hold the pipe element together in the event of tack weld failure. Affixing the auxiliary connectors before the welding process and removing the auxiliary connectors after the welding process involves a high time expenditure, which markedly reduces productivity. Accordingly, for elaborate projects, on-time completion is accompanied by higher cost. In some cases, affixing auxiliary connectors is not possible, since welding the auxiliary connectors can result in structural changes in the pipe material.

The object of the invention is to provide a device for connecting the ends of an open pipe element, which device overcomes the stated disadvantages and in particular allows heavy and large-diameter pipes to be prepared for longitudinal-seam welding, with high safety, high reproducibility, and low costs.

The main features of the invention are recited in the characteristic part of claim 1.

Further embodiments are the subject matter of the dependent claims or described below.

The clamping device according to the invention for temporarily connecting two ends of a large-pipe element comprises at least two connection devices and a rigid connection rod. The connection devices are arranged at the ends of the connection rod. According to the invention, the connection device is a gripping device. The gripping device comprises
- a base frame,
- a joint that connects the base frame and connection rod,
- at least two gripping jaws opposite from one another that are arranged below the joint, wherein each gripping jaw comprises a gripping surface that bears against the pipe element in the closed state of the clamping device,
- at least one gripping element on a gripping jaw, which gripping element comprises an adjusting mechanism for altering the position so that the gripping element is adjustable. In the gripping region, the gripping element at least partially comprises a gripping surface that at least partially has a domed or flat shape. The gripping surface also forms the contact surface with which the gripping device rests on the surfaces of the pipe element and via which the contact and the connection are produced between the clamping device according to the invention and the steel plate of the pipe element. At least one gripping device each is mounted in an articulated manner at the two ends of the connection rod. The gripping devices are each arranged on the same side relative to the connection rod; preferably, the gripping devices are arranged below the connection rod in a vertical direction. In the open state, there is between the gripping jaws of one gripping device an opening which is limited by the gripping jaws and the base frame and into which the edge of the pipe element can be inserted to be immobilized. In terms of their position, the gripping jaws and the base frame are oriented relative to the connection rod. Accordingly, the opening between the gripping jaws is also oriented relative to the connection rod and points in a direction from which the pipe element can be received. The gripping devices are each oriented such that the openings of two different gripping devices, which openings are located between the gripping jaws, point in the same direction relative to the connection rod, that is, to the right side relative to the connection rod for example, and the openings and therefore the opposing gripping jaws of two different gripping devices are positioned on the same side of the connection rod, that is, below the connection rod, for example.

This is achieved because the gripping devices are positioned on the same side of the connection rod with the same orientation of the gripping jaws and base frame. The gripping jaws and the openings located therebetween each lie on a circular arc that has roughly the same curvature as the pipe element; that is, the upper gripping jaws lie on a first circular arc, the lower gripping jaws lie on another circular arc with the same center, and the longitudinal direction of the openings lies on a third circular arc with the same center. Preferably, the clamping device according to the invention comprises two gripping devices.

The terms upper and lower are to be understood relatively, and only serve an illustrative purpose in the specification. Upper and lower refer to a position of the clamping device according to the invention in which the clamping device is not installed, but rather is lying on the ground, for example, and in which the connection rod, viewed in a vertical direction, is arranged above the gripping devices. In the installed state, upper and lower depend on the position of the clamping device on the pipe element.

The joint on the base frame that connects the base frame and connection rod is preferably a swivel joint, wherein the connection rod preferably comprises a joint receiver, and the joint axis is arranged on the base frame with a fastening device, wherein the joint axis runs perpendicular to the connection rod. The joint axis is embodied as a bolt or pin, for example. With the joints, the gripping devices can be adjusted relative to one another in terms of their inclination. The clamping device according to the invention is adapted to the diameter of the pipe element by moving the gripping device in the joint. Accordingly, the clamping device according to the invention can be used for pipe elements with different diameters.

Preferably, the gripping device comprises an upper and a lower gripping jaw. The cross section of said gripping device is C-shaped, with the two gripping jaws forming the upper and lower end of the C, or in the shape of a U-profile, with the two gripping jaws forming the two legs of the U. The base body preferably comprises a reinforcing rib which forms the upper side of the base body with the upper gripping jaw arranged thereon, the rear side of the base body, possibly with a reinforced rear wall additionally directed inwards, and a receiver for the lower gripping jaw. The reinforcing rib is preferably embodied to be C-shaped or in the shape of a U-profile. The opening of the gripping device corresponds in this case to the opening of the C or U. Accordingly, both C-C or U-U profiles are rotated in the same direction relative to the connection rod, so that the openings of the C-profiles or U-profiles or identically oriented.

The upper gripping jaw is preferably part of the base frame and rigidly connected thereto. Alternatively or additionally, at least one gripping element is preferably arranged in the lower gripping jaw.

In one embodiment, the gripping element is a screw pin with a gripping plate, wherein the gripping plate is a curved plate with a circular-segment cross section, a convex plate, a domed plate, a rippled plate, a plate that has multiple protrusions out of the plane, or a flat plate. In a curved plate, the cylindrical axis runs perpendicularly to the connection rod and parallel to the center axis of the pipe element. Due to the shape of the gripping surfaces, the clamping device according to the invention always bears tangentially against the pipe element. The use of screws allows a high gripping force with a compact design.

Preferably, the gripping surface at least partially has a structured surface; it is particularly preferred that the entire gripping surface has a structured surface. In one embodiment, the structured surface is composed of the same material as the gripping plate and is a roughened surface or a profiled surface of a combination thereof. In a further embodiment, the structured surface comprises for the structuring a coating, for example a diamond layer or a foreign material layer, such as leather or rubber, for example. All materials that improve the friction value (coefficient of friction) are suitable as a coating or foreign material layer. The structured surface results in improved static friction, so that a slipping of the clamping device in the closed state is effectively avoided. With the structured surface in the gripping region, a predictable friction value between the clamping device according to the invention and the pipe element is created.

Combinations of the two embodiments are also possible; in particular, different gripping plates of one gripping device can have a different embodiment of a structured surface.

In a preferred embodiment, each gripping device comprises four gripping surfaces, preferably two gripping surfaces on the upper gripping jaw and two gripping surfaces on the lower gripping jaw, wherein the gripping surfaces are located opposite one another in pairs. The use of four gripping surfaces per side results in a good distribution of the gripping force, so that no deformation occurs on the pipe element.

In one embodiment, the clamping device according to the invention comprises an adjusting aid that is arranged on the connection rod and with which the position of the gripping connectors along the swivel axis of the joint is adjusted; this is preferably a holder, for example a joining plate with a set screw. The adjusting aid is used when the clamping device according to the invention is to be used for pipe elements of different diameters. In order for the steel sheet of the pipe element to come to rest between the gripping jaws, the gripping device must be oriented in accordance with the curvature of the pipe element. This can take place manually during the mounting of the clamping device on the pipe element. However, since the inclination of the gripping device is always the same depending on the pipe diameter, the inclination can be set accordingly prior to the mounting. With the adjusting aid, for example by adjusting the set screw, the gripping device is fixed in place at the desired inclination angle. The mounting of the clamping device according to the invention can take place more quickly in this case, since no manual adjustment on the pipe element is necessary. The adjusting aid allows a secure and reproducible mounting of the clamping device and makes work easier for the user. Optionally, at least one lever is additionally mounted, preferably detachably mounted, on the gripping device, with which lever the gripping device can additionally be manually oriented. The lever can, for example, be screwed or inserted into a corresponding opening in the gripping device and removed again after the adjustment. In its simplest form, the lever is embodied as a rod or handle. The lever is preferably used in combination with the adjusting aid in order to enable a readjustment on the pipe element.

The clamping device according to the invention optionally comprises a mounting aid. The clamping device according to the invention is thus mounted on the pipe element until the rear wall of the base frame of the gripping device bears against the face of the pipe element. The main function of the mounting aid is to align the clamping device parallel to the pipe element. In this manner, a jamming of the two gripping devices and thus a slipping of the clamping device or damaging of the pipe element is prevented. The mounting aid is embodied as an extension plate, for example, and laterally attached to the rear wall of the base frame.

The clamping device optionally comprises an attachment means that is affixed to the connection rod. The attachment means is embodied, for example, as an eye or weld-on plate with weld-on eyes on the upper side of the connection rod, into which a crane hook, for example, can engage. With the attachment means, the clamping device according to the invention can be directly connected to the suspension means of the lifting equipment, for example a crane hook. The clamping device according to the invention can thus be more easily transported to and from the job site.

The clamping device according to the invention is used to connect and secure the plate ends of large pipes and large-pipe elements having a pipe diameter of 4.5 m to 10 m, preferably 6 m to 10 m. In a typical construction, the pipes have a wall thickness of 30 mm to 250 mm, preferably 35 to 200 mm, particularly preferably 50 mm to 170 mm. Large pipes and large-pipe elements with a diameter of 6 m to 10 m preferably have a wall thickness of 50 mm to 170 mm. A large-pipe element typically has a length of 2 m to 4.2 m.

Accordingly, the clamping device according to the invention has a connection rod with a length of preferably 0.5 m to 1.5 m in order to be able to securely connect the plate ends.

All components of the clamping device according to the invention are preferably made of steel. The steel grade is preferably as high as possible in order to minimize the clamping device's own weight.

The clamping device according to the invention is connected to the ends of the open pipe element in a force fit. Unlike the welded-on tack connectors, where a materially-bonded connection occurs, the material of the pipe element is not impaired by the force-fitting connection.

The clamping device according to the invention is, unlike the known tack welds or auxiliary connectors (cleats), mobile, reusable, and versatile. It can be mounted quickly and securely on pipe elements of different diameters in order to reduce the load on the tack weld and, in the event of tack weld failure, take the place of it. The clamping device according to the invention is fixed in place on both sides of the tack weld as a connector and thus connects the ends of the pipe element. The connection rod is thereby mounted in an articulated manner so that multiple diameters can be covered. With different attachment points, a variable mounting of the cleat in a horizontal or vertical position is possible. Due to its construction, the clamping device according to the invention adapts to different diameters and wall thicknesses. Because of the design with the gripping jaws, in particular with a structured surface, a system is provided which does not slip and does not leave any major damage on the pipes.

The clamping device according to the invention offers a host of advantages:
- The clamping device according to the invention adapts to any diameter and any wall thickness.
- It demonstrably minimizes the tension in the tack weld, so that a simple tacking without welded-on auxiliary connectors is sufficient for transport between the work stations.
- It enables a quick mounting in contrast to the time expenditure of the cleat welding.
- It secures the pipe element in the event of tack weld failure.
- It is reusable, whereby costs are saved.
- No welding-in of auxiliary connectors (cleat welding) is necessary, so that there is no thermal loading of the pipe element as a result of the welding-in.

Furthermore, the object of the invention is a method for producing a longitudinally-seam-welded large-pipe element with a diameter of at least 4.5 m, preferably 6 m to 10 m, according to patent claim 12.

The method according to the invention comprises the steps:
a) providing a steel sheet that is composed of wear-resistant, hardenable steel;
b) bending/shaping the steel sheet into a tubular preform in which two longitudinal edges of the bent steel sheet are positioned opposite one another and border between them a welding joint;
c) connecting the two ends of the bent steel sheet using a clamping device according to the invention according to one of patent claims 1 through 11 with a positioning of the clamping device on the outside of the pipe element so that the steel sheet comes to rest between the gripping jaws, a closing of the gripping device by actuating the gripping element until the gripping surfaces bear against the steel sheet and a force-fitting connection is present;
d) applying a tack weld in the welding joint;
e) welding the longitudinal edges arranged opposite one another and bordering the welding joint, with a formation of a weld that closes the welding joint;
f) possibly removing the tack weld;
g) removing the clamping device with a loosening of the gripping element so that the gripping jaws release the steel sheet and a detaching of the clamping device from the pipe element.

The weld seam preparation takes place, for example, by means of a machining or grinding method, such as lathing, milling or another method, and ensures a cleaning of the weld seam. Additionally, the accuracy of fit of the seam positions is improved. In large-pipe manufacturing, weld seam preparations are carried out on the raw sheet on the inner seam prior to the bending. The longitudinal edge for the eventual weld of the large pipe is pretreated on the flat raw sheet. The sheet panel blank is then bent into a round shape, the inner seam is welded, and only then does the weld seam preparation for the outer seam occur.

The clamping device according to the invention is used to connect the ends of a round-bent steel sheet with a diameter of at least 4.5 m, preferably 4.5 to 10 m, in the production of a longitudinal-seam-welded large-pipe element.

Figure 2:
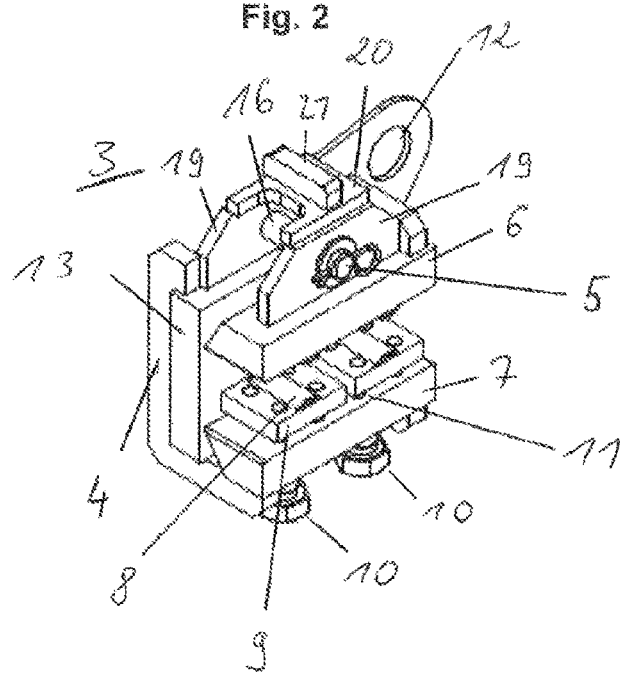

Additional features, details, and advantages of the invention follow from the text of the claims and from the following description of exemplary embodiments with the aid of the drawings. The following show:

FIG. 1 an embodiment of a clamping device according to the invention,

FIG. 2 a gripping device without connection rod, and

Figure 3:
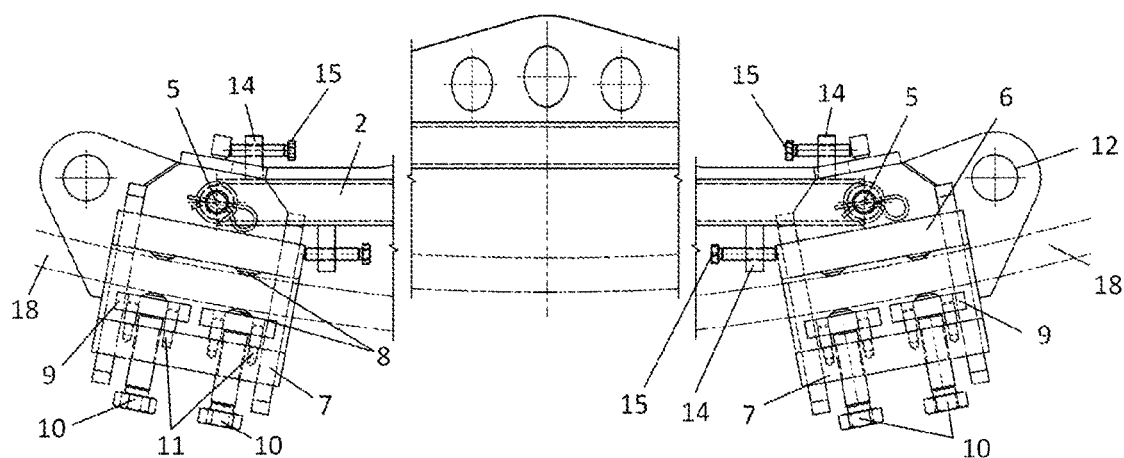

FIG. 3 a clamping device according to the invention, mounted on a steel sheet.

FIG. 1 shows an embodiment of a clamping device 1 according to the invention in a perspective view. The arrow points from top to bottom. The clamping device 1 has a rigid connection rod 2 that is embodied as a straight bar. On the upper side, the connection rod 2 comprises an attachment means that serves to attach the clamping device 1 to lifting equipment. The attachment means is embodied as a straight plate with three openings in the form of a weld-on plate 17 with three weld-on eyes 12 into which a crane hook, for example, can engage. One gripping device 3 each is arranged at both ends of the connection rod 2. One weld-on eye 12 each is also attached to both gripping devices. To facilitate the positioning of the gripping device 3, two adjusting aids each are arranged on the connection rod 2 at both ends. The adjusting aids each comprise a holder 14 and a set screw 15.

The gripping devices are in this case embodied to be structurally identical, with only some elements being arranged in mirror inversion. The gripping device 3 comprises a base frame. The base from has a reinforcing rib 4, which in this case is embodied in the shape of a C, a rear wall 13, and an upper gripping jaw 6. On the reinforcing rib 4 of the base frame, the joint 5 is attached in the upper region, via which joint 5 the connection rod 2 is connected to the gripping device 3 in an articulated manner. The joint 5 is embodied as a swivel joint. Below the joint 5, the upper gripping jaw 6 is arranged, which in this case is part of the base frame and thus fixed. In the downward direction, the base frame continues in a rear wall 13 that serves as a contact surface for the pipe element and limits the gripping device in one direction. Below the rear wall 13, the base frame comprises a receiver for the lower gripping jaw 7. The lower gripping jaw 7 is in this case embodied as an adjustable gripping element. The dashed line N shows the inclination of the two gripping devices adapted to the curvature of the pipe element. On both gripping devices 3, the openings between the gripping jaws lie below the connection rod 2. On both gripping devices 3, they lie on the right side of the connection rod 2 and open in the same direction to the right.

FIG. 2 shows a gripping connector 3 without connection rod. The base frame of the gripping connector comprises on the upper side a fastening device for the joint 5. The axis 16 of the joint is arranged between two side plates 19. In the upward direction, the joint is covered by a cover plate 20. Below the joint, the upper gripping jaw 6 is located, which is a component of the base frame. The rear wall 13 extends on the rear side, which rear wall 13 is limited in the downward direction by the receiver for the lower gripping jaw 7. The lower gripping jaw 7 comprises two gripping elements that are held in the gripping jaw 7 and are part of the gripping jaw. The gripping elements are formed by a screw pin 11 and a gripping plate 9 attached thereto. The gripping surface 8 is attached to the gripping plate 9. The position of the gripping elements can be altered by turning the screw pins 11. If the tensioning screw 10 is tightened, the gripping plate 9 moves in the direction of the upper gripping jaw 6 and can thus grip a pipe element located between the gripping jaws. If the tensioning screw 10 is loosened, the gripping plate 9 moves downwards accordingly and once again releases a pipe element gripped between the gripping jaws. On the upper side of the gripping device, a weld-on eye 12 is additionally affixed as an attachment means. On the cover plate 20 of the joint, a stop 21 for the adjusting aid is arranged.

FIG. 3 schematically shows in a sectional view a clamping device according to the invention attached to a pipe element 18. The pipe element 18 is gripped between the gripping surfaces 8, of which two each are rigidly attached to the upper gripping jaw 6 and two are adjustably arranged on the lower gripping jaw 7. The gripping surfaces 8 of the lower gripping jaw 7 are attached to the gripping plates 9. The two gripping devices 3 are inclined in accordance with the curvature of the pipe element. They are fixed in their position by the adjusting aids. For this purpose, the set screw 15 is adjusted in the holder 14 such that it prevents an inward pivoting of the gripping devices.

All features and advantages arising from the claims, the specification, and the drawing, including constructive details, spatial arrangements, and method steps, can be essential to the invention both separately and also in the most widely different combinations.

LIST OF REFERENCE NUMERALS

Clamping device 1
Connection rod 2
Gripping device 3
Reinforcing rib (base frame) 4
Joint 5
Upper gripping jaw (base frame) 6
Lower gripping jaw (base frame) 7
Gripping surface 8
Gripping plate 9
Tensioning screw 10
Screw pin 11
Adjusting aid 12
Rear wall (base frame) 13
Adjusting aid holder 14
Set screw 15
Axis (joint) 16
Weld-on plate 17
Pipe element 18
Side plates (joint) 19
Cover plate (joint) 20
Adjusting aid stop 21

What is claimed is:

1. A clamping device for temporarily connecting two ends of a large-pipe element, comprising:
    at least two connection devices; and
    a connection rod, wherein
    the connection devices are arranged at ends of the connection rod,
    each connection device is a gripping device that is mounted to one of the ends of the connection rod in an articulated manner, each gripping device comprises:
    a base frame;
    a joint that connects the base frame and connection rod; and
    at least two gripping jaws that are arranged below the joint and oppose one another such that an opening is provided between the at least two gripping jaws in an open state of the clamping device, wherein
    each gripping jaw includes at least one gripping surface that bears against the large-pipe element in a closed state of the clamping device,
    at least one gripping jaw includes at least one gripping element that has a mechanism for adjusting a position of the gripping element,
    the gripping element includes the gripping surface, and
    each gripping device is respectively oriented such that the openings of the at least two gripping jaws point in a same direction and are positioned on a same side of the connection rod to receive the large-pipe element.

2. The clamping device according to claim 1, wherein the at least two gripping jaws include an upper gripping jaw and a lower gripping jaw, and the upper gripping jaw is part of the base frame and connected thereto, and a cross section of the gripping device is a C-shaped profile or a U-shaped profile.

3. The clamping device according to claim 1, wherein the at least two gripping jaws include an upper gripping jaw and a lower gripping jaw, and the at least one adjustable gripping element is arranged in the lower gripping jaw.

4. The clamping device according to claim 1, wherein the gripping element is a screw pin with a gripping plate, the gripping plate is one of a convex plate, a curved plate with a circular-segment cross section, a domed plate, a rippled plate, a plate that has multiple protrusions, a flat plate, or a round, curved plate in of a cylindrical section shape.

5. The clamping device according to claim 1, wherein the gripping surface includes a partially structured surface or an entirely structured surface.

6. The clamping device according to claim 5, wherein the structured surface is a roughened surface, a profiled surface, or a combination thereof, and the structured surface and the gripping plate are composed of a same material.

7. The clamping device according to claim 5, wherein the structured surface is a coating or a foreign material that is applied to a surface of the gripping plate.

8. The clamping device according to claim 2, wherein the upper gripping jaw includes two gripping surfaces and the lower gripping jaw includes two gripping surfaces.

9. The clamping device according to claim 1, wherein
the gripping surface has a round, curved cylindrical section shape, a convex shape, a rippled shape, a serrated shape, or a flat shape, and
the gripping surface has multiple surface portions arranged on a circular arc that bear against the large-pipe element in the closed state.

10. The clamping device according to claim 1, further comprising:
an adjusting aid that is arranged on the connection rod and configured to adjust a position of each gripping device along a swivel axis of the joint wherein,
the adjusting aid is a set screw with a holder and a stop.

11. The clamping device according to claim 1, further comprising:
attachment means attached to at least one of the connection rod or the gripping device.

12. The clamping device according to claim 1, wherein
each gripping device is arranged below the connection rod in a vertical direction,
each gripping device is positioned on the same side of the connection rod with the same orientation with the at least two gripping jaws and base frame, and
the at least two gripping jaws and the opening located therebetween each lie on a circular arc.

13. A method for producing a longitudinal-seam-welded large-pipe element with a diameter of at least 4.5 meters, comprising:
providing a steel sheet that is composed of wear-resistant, hardenable steel;
bending the steel sheet into a tubular preform in which two longitudinal edges of the bent steel sheet are positioned opposite one another and border between them a welding joint;
connecting two ends of the bent steel sheet using the clamping device according to claim 1 with a positioning of the clamping device on the outside of the pipe element so that the steel sheet comes to rest between the gripping jaws, a closing of the gripping device by actuating the gripping element until the gripping surfaces bear against the steel sheet and a force-fitting connection is present;
applying a tack weld in the welding joint;
welding the longitudinal edges arranged opposite one another and bordering the welding joint, with a formation of a weld which closes the welding joint; and
removing the clamping device with a loosening of the gripping element so that the gripping jaws release the steel sheet and a detaching of the clamping device from the pipe element.

14. The clamping device according to claim 1, wherein the large-pipe element is a round-bent steel sheet that is weldable along a longitudinal seam thereof, and has a diameter of at least 4.5 meters.

15. The method for producing the longitudinal-seam-welded large-pipe element of claim 13, further comprising:
removing the tack weld.

* * * * *